(12) United States Patent
Sakai

(10) Patent No.: US 12,315,146 B2
(45) Date of Patent: May 27, 2025

(54) CALCULATION METHOD, CALCULATION DEVICE, AND COMPUTER-READABLE RECORDING MEDIUM

(71) Applicant: FUJITSU LIMITED, Kawasaki (JP)

(72) Inventor: Akira Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 524 days.

(21) Appl. No.: 17/709,769

(22) Filed: Mar. 31, 2022

(65) Prior Publication Data

US 2022/0398723 A1 Dec. 15, 2022

(30) Foreign Application Priority Data

Jun. 10, 2021 (JP) ................................ 2021-097657

(51) Int. Cl.
*G06T 7/00* (2017.01)

(52) U.S. Cl.
CPC .. *G06T 7/0012* (2013.01); *G06T 2207/20081* (2013.01); *G06T 2207/30048* (2013.01); *G06T 2207/30101* (2013.01)

(58) Field of Classification Search
CPC ......... G06T 7/0012; G06T 2207/20081; G06T 2207/30048; G06T 2207/30101
USPC ....................................................... 382/128
See application file for complete search history.

(56) References Cited

U.S. PATENT DOCUMENTS

| 2018/0325489 | A1* | 11/2018 | De Beni | ............... | A61B 5/0035 |
| 2019/0332900 | A1* | 10/2019 | Sjolund | .................. | G06T 9/002 |
| 2020/0060659 | A1 | 2/2020 | Komatsu et al. | | |
| 2021/0158514 | A1* | 5/2021 | Greiser | .................. | A61B 5/055 |

FOREIGN PATENT DOCUMENTS

JP 2020-028680 A 2/2020

OTHER PUBLICATIONS

Mohammad Amin Sadeghi et al., "30Hz Object Detection with DPM V5", Computer Vision, ECCV 2014, Part I, LNCS 8689, pp. 65-79, 2014, Springer International Publishing Switzerland 2014 (Total 15 pages).

(Continued)

*Primary Examiner* — Ayodeji O Ayotunde
(74) *Attorney, Agent, or Firm* — Fujitsu Intellectual Property Center

(57) ABSTRACT

A non-transitory computer-readable recording medium stores therein a calculation program that causes a computer to execute a process including acquiring a first distributed representation of a partial image corresponding to a specific site of an object to be examined included in each of a plurality of images, by executing machine learning performed by an autoencoder using the partial image of an area corresponding to the specific site, for each of one or more specific sites, and acquiring a second distributed representation of the plurality of images, based on the first distributed representation and a result of machine learning performed by the autoencoder, using the plurality of images, wherein abnormality determination on the object to be examined included in an image to be determined is executed, based on the first distributed representation and the second distributed representation.

18 Claims, 12 Drawing Sheets

(56) References Cited

OTHER PUBLICATIONS

Joseph Redmon et al., "You Only Look Once: Unified, Real-Time Object Detection", pp. 1-10, arXiv:1506.02640v5 [cs.CV], May 9, 2016 (Total 10 pages).
Extended European Search Report dated Sep. 22, 2022 for corresponding European Patent Application No. 22165070.8, 8 pages.
Komatsu, Masaaki et al., "Detection of Cardiac Structural Abnormalities in Fetal Ultrasound Videos Using Deep Learning", Applied Sciences, vol. 11, Issue 1, Jan. 2, 2021, pp. 2-12, XP055814422.
Ali, Mohammed et al., "TimeCluster: dimension reduction applied to temporal data for visual analytics", Visual Computer, Springer, vol. 35, No. 6, May 9, 2019, pp. 1013-1026, XP036800800 [Retrieved on May 9, 2019].

* cited by examiner

| TIME (s) | | 0.01 | 0.02 | 0.03 | 0.04 | ... | 15.0 |
|---|---|---|---|---|---|---|---|
| VENTRICU-LAR SEPTUM | PROBABILITY (p) | 0 | 0 | 0.03 | 0.4 | ... | 0 |
| | POSITION (x, y) | (0, 0) | (0, 0) | (20, 80) | (21, 81) | ... | 0 |
| | SIZE (h, w) | (0, 0) | (0, 0) | (10, 2) | (9, 2) | ... | 0 |
| ... | ... | ... | ... | ... | ... | ... | ... |
| LEFT VENTRICLE | PROBABILITY (p) | 0 | 0.4 | 0.5 | 0.3 | ... | 0 |
| | POSITION (x, y) | (0, 0) | (10, 10) | (10, 10) | (10, 11) | ... | 0 |
| | SIZE (h, w) | 0 | (5, 4) | (5, 5) | (5, 5) | ... | 0 |

CALCULATION METHOD, CALCULATION DEVICE, AND COMPUTER-READABLE RECORDING MEDIUM

CROSS-REFERENCE TO RELATED APPLICATION

This application is based upon and claims the benefit of priority of the prior Japanese Patent Application No. 2021-097657, filed on Jun. 10, 2021, the entire contents of which are incorporated herein by reference.

FIELD

The embodiments discussed herein are related to a computer-readable recording medium, a calculation method, and a calculation device.

BACKGROUND

An ultrasonic examination for examining the presence or absence of abnormality in an internal structure without destroying an object has been known. For example, the ultrasonic examination is performed by capturing an image of a two-dimensional scanned cross-section of an object to be examined, and checking the image of the scanned cross-section. For example, because a probe used for capturing images is scanned by a person, the image of the scanned cross-section is strongly affected by a change in the image capturing environment. As a result, the image of the scanned cross-section, which is an ultrasonic examination image, is often checked visually. Moreover, as a technology for providing valuable information for diagnosis, a technology of generating a three-dimensional model from the scanning results using computed tomography (CT) and magnetic resonance imaging (MRI), and providing information on any cut surface has been known.

Moreover, an object detection technology for detecting what kind of object appears in an image has been known. For example, in the object detection technology, as a technique for detecting an object in an image by machine learning, a deformable parts model (DPM) and You Only Look Once (YOLO) have been developed.

Moreover, a technology for determining whether abnormality is present in an object in an image, using the results obtained by the object detection technology has been known. Such a technology is used in medical diagnosis using ultrasound images, examination of defects in manufactured products, and the like.

Furthermore, as an abnormality determination process using the object detection technology, there is a process of using detection map information in which the detection result of each of a plurality of types of feature values and the time series of a plurality of frame images are associated with each of the frame images included in moving image data obtained by capturing images of an object. This process determines the presence or absence of abnormality, by calculating a distributed representation indicating a set of points obtained by compressing and projecting the distribution state of the detection results, when the position of a section area with a predetermined width set in the detection map information is changed in time series, onto a low-dimensional space, and from the trajectory of the distributed representation (Japanese Laid-open Patent Publication No. 2020-028680; M. A. Sadeghi and D. Forsyth, "30 Hz Object Detection with DPM V5", Computer Vision-ECCV 2014, pages 65-79, Springer, 2014; and Joseph Redmon, Santosh Divvala, Ross Girshick, Ali Farhadi, "You Only Look Once: Unified, Real-Time Object Detection", arXiv: 1506.02640v5 [cs.CV], 9 May 2016).

SUMMARY

According to an aspect of the embodiments, a non-transitory computer-readable recording medium stores therein a calculation program that causes a computer to execute a process including: acquiring a first distributed representation of a partial image corresponding to a specific site of an object to be examined included in each of a plurality of images, by executing machine learning performed by an autoencoder using the partial image of an area corresponding to the specific site, for each of one or more specific sites; and acquiring a second distributed representation of the plurality of images, based on the first distributed representation and a result of machine learning performed by the autoencoder, using the plurality of images, wherein abnormality determination on the object to be examined included in an image to be determined is executed, based on the first distributed representation and the second distributed representation.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in the abnormality determination using the distributed representation, information such as positional information, size information, and probability of the detection site are encoded into distributed representations all at once, and become a black box. As a result, it is not possible to control the obtained compressed information, and there is no knowing which site information is affecting which part of the distributed representation.

In one aspect, the embodiments provide a calculation program, a calculation method, and a calculation device capable of analyzing which site has contributed to the distributed representation.

Preferred embodiments will be explained with reference to accompanying drawings. However, the present embodiment is not limited to the examples. Moreover, the examples can be appropriately combined within a consistent range.

First Example

Figure 1:
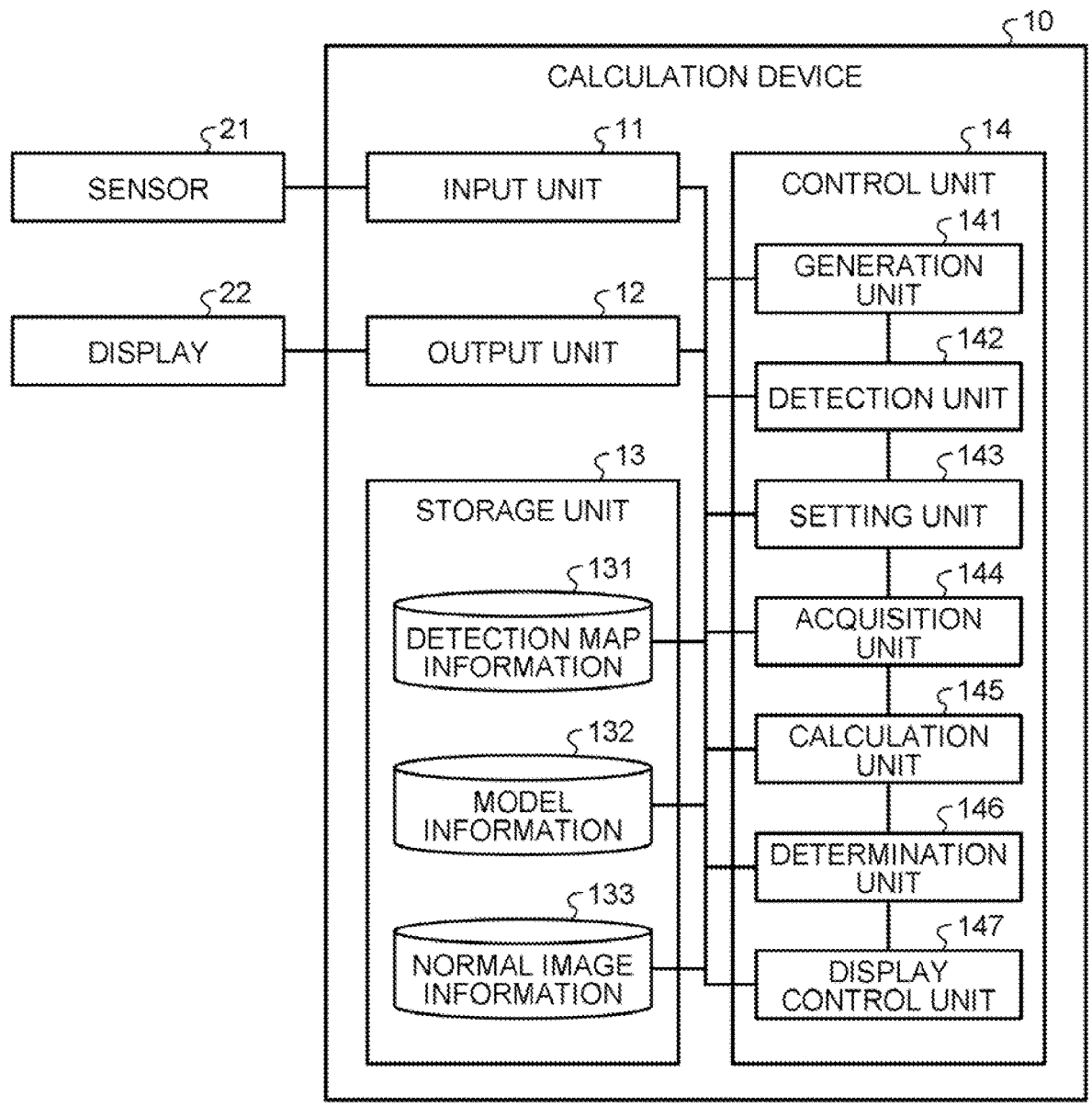
FIG. 1 is a diagram illustrating a configuration example of a calculation device 10 according to a first example.

First, a configuration of a calculation device according to an example will be described with reference to FIG. 1. FIG. 1 is a diagram illustrating a configuration example of a calculation device 10 according to a first example. As illustrated in FIG. 1, the calculation device 10 receives data input from a sensor 21. Moreover, the calculation device 10 outputs data to a display 22.

The calculation device 10 calculates a distributed representation from an image, and determines whether abnormality is present in an object in an image based on the distributed representation. In particular, the calculation device 10 can calculate a distributed representation from a plurality of images in time series. Such images in time series may be frame images forming moving image data.

The sensor 21 is a device for acquiring a signal for generating an image in which abnormality is determined. For example, the sensor 21 is a probe that emits ultrasonic waves to an object, and that receives reflected waves of the ultrasonic waves. For example, the probe may be used for medical examinations and a non-destructive examination of an object. Moreover, for example, the sensor 21 may be a red-green-blue (RGB) camera for capturing an image of an object.

The sensor 21 may input the collected signal to the calculation device 10 as it is, or may input data on an image generated from the signal to the calculation device 10. That is, the calculation device 10 may generate an image based on the signal received from the sensor 21, or may receive an image from the sensor 21.

As illustrated in FIG. 1, the calculation device 10 includes an input unit 11, an output unit 12, a storage unit 13, and a control unit 14. The input unit 11 is an interface for data input. For example, the input unit 11 receives data input from the sensor 21. Moreover, the input unit 11 may also receive data input via an input device such as a mouse and a keyboard. Furthermore, the output unit 12 is an interface for data output. For example, the output unit 12 outputs data to an output device such as the display 22.

The storage unit 13 is an example of a storage device that stores data, a computer program executed by the control unit 14, and the like. For example, the storage unit 13 is a hard disk, memory, and the like. The storage unit 13 includes detection map information 131, model information 132, and normal image information 133.

The detection map information 131 is an example of information in which the detection result of each of a plurality of types of feature values and the time series of a plurality of frame images are associated with each of the frame images included in moving image data obtained by capturing images of an object. For example, the detection map information 131 is assumed to be a set of xml data corresponding to each of the frame images. Moreover, a plurality of types of feature values may be written in each xml data.

Figure 2:
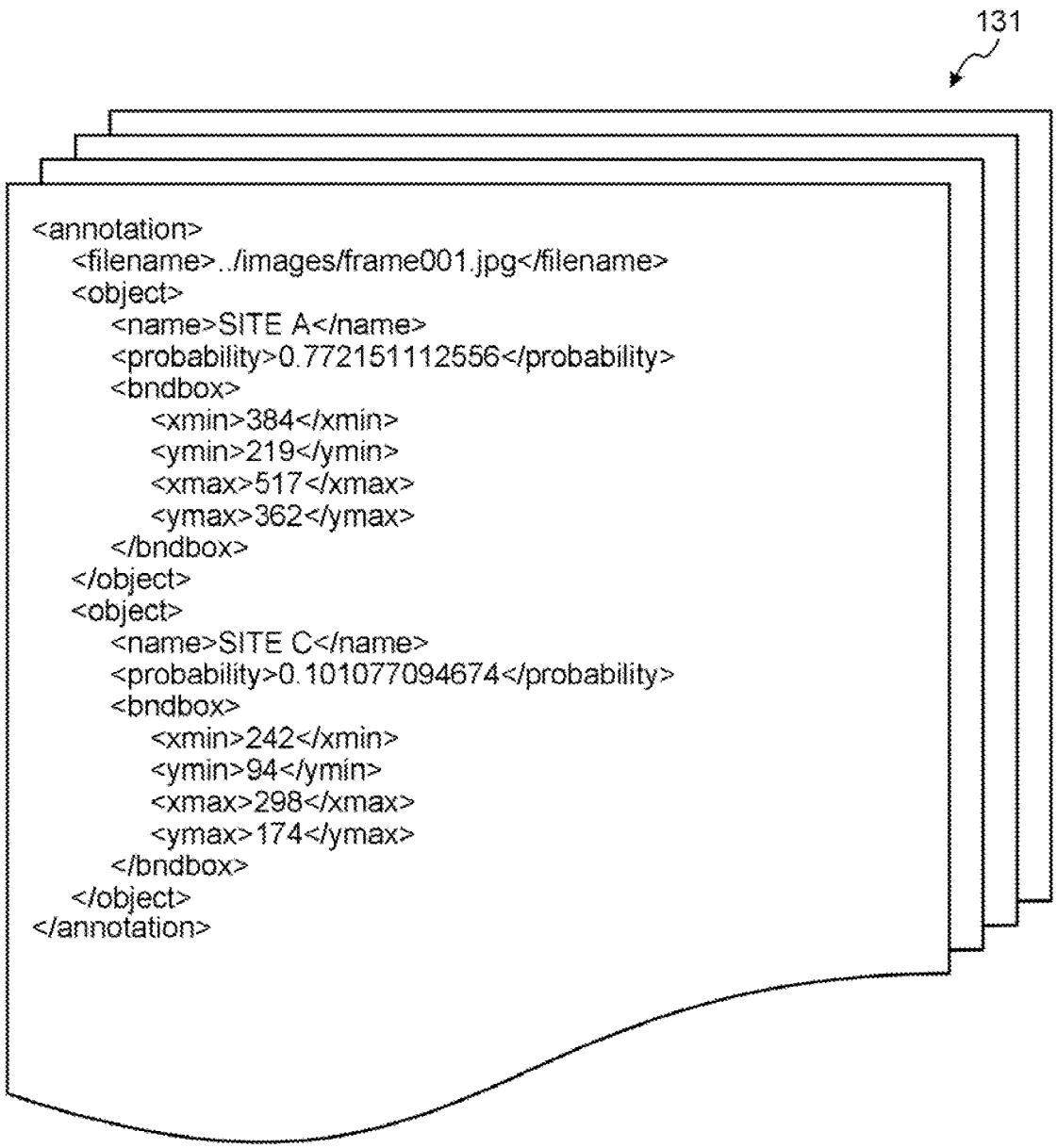
FIG. 2 is a diagram illustrating an example of detection map information 131 according to the first example.

FIG. 2 is a diagram illustrating an example of detection map information. As illustrated in FIG. 2, the detection map information 131 is a set of xml data. In a filename element of the xml data, a file path of a corresponding frame image is written.

In this example, the sensor 21 may be a probe for medical examinations. Moreover, the detection map information 131 may be a feature value obtained from an ultrasound image. The feature value may include probability that is calculated according to the level of likelihood of each site appearing in a frame image, which is set in advance. Furthermore, the feature value may also include coordinates of two apexes of a rectangle indicating an area where each site is assumed to appear in a frame image.

In a name element of the xml data, the name of the site is written. In the xml data, only the site information in which the probability is not zero or the probability is equal to or more than a certain value may be written. Moreover, a probability element indicates the probability of the site written in the name element. The probability is increased with an increase in the likelihood of the corresponding site appearing in the frame image.

An xmin element and a ymin element represent coordinates of an apex of the rectangle. Moreover, an xmax element and a ymax element represent coordinates of an apex that does not share the side with the apex represented by the xmin element and the ymin element. That is, when the coordinates of the two apexes are decided, the position and size of the rectangle are decided. For example, the coordinates represented by the xmin element and the ymin element indicate the apex of the rectangle at the upper left. Moreover, the coordinates represented by the xmax element and the ymax element indicate the apex of the rectangle at the lower right.

An example of the xml data illustrated in FIG. 2 corresponds to a file of a frame image named "frame001.jpg". Moreover, an example of the xml data in FIG. 2 indicates that a site A is present in a rectangular area the apex of which is at a point (384, 219) and a point (517, 362), and that the probability of the site is 0.772151112556. Moreover, an example of xml data in FIG. 2 indicates that a site C is present in a rectangular area the apex of which is at a point (242, 94) and a point (298, 174), and that the probability of the site is 0.101077094674. For example, the coordinates may also be expressed in pixel units.

The model information 132 is information such as a parameter for building a model used for calculating a distributed representation. In the present example, it is assumed that the model is an autoencoder. In this case, the model information 132 includes a parameter such as weight set for each unit of the autoencoder.

The normal image information 133 is information on a frame image of an object in a normal state. The normal image information 133 may be a frame image, a feature value of the frame image, or distributed representation obtained from the feature value of the frame image.

The information described above to be stored in the storage unit 13 is merely an example, and the storage unit 13 can store various types of information in addition to the information described above.

For example, the control unit 14 is implemented when a computer program stored in an internal storage device is executed by a central processing unit (CPU), a micro processing unit (MPU), a graphics processing unit (GPU), and the like using random-access memory (RAM) as a work area. Moreover, for example, the control unit 14 may also be implemented by an integrated circuit such as an application specific integrated circuit (ASIC) and a field programmable gate array (FPGA). The control unit 14 includes a generation unit 141, a detection unit 142, a setting unit 143, an acquisition unit 144, a calculation unit 145, a determination unit 146, and a display control unit 147. Each processing unit is an example of an electronic circuit in a processor or an example of a process executed by a processor.

The generation unit 141 generates a frame image based on data input from the sensor 21. When a frame image is input from the sensor 21, there is no need for the generation unit 141 to generate a frame image.

The detection unit 142 extracts a feature value from the frame image, and stores the feature value in the storage unit 13 as the detection map information 131. The detection unit 142 detects the feature value including the probability using a detection model already trained with an image of each site. For example, the detection model may also be a model that uses an object detection algorithm such as You Only Look Once (YOLO), Single Shot Multibox Detector (SSD), and Faster-Regional Convolutional Neural Network (Faster-RCNN).

The detection unit 142 detects probability, which is an index corresponding to the level of likelihood of each of a plurality of objects appearing in each of the frame images, which is set in advance. The objects correspond to the sites to be detected. Moreover, the detection unit 142 also detects the size and position of a rectangular area in the frame image, in which the likelihood of the presence of an object is equal to or more than a predetermined value.

Figure 3:
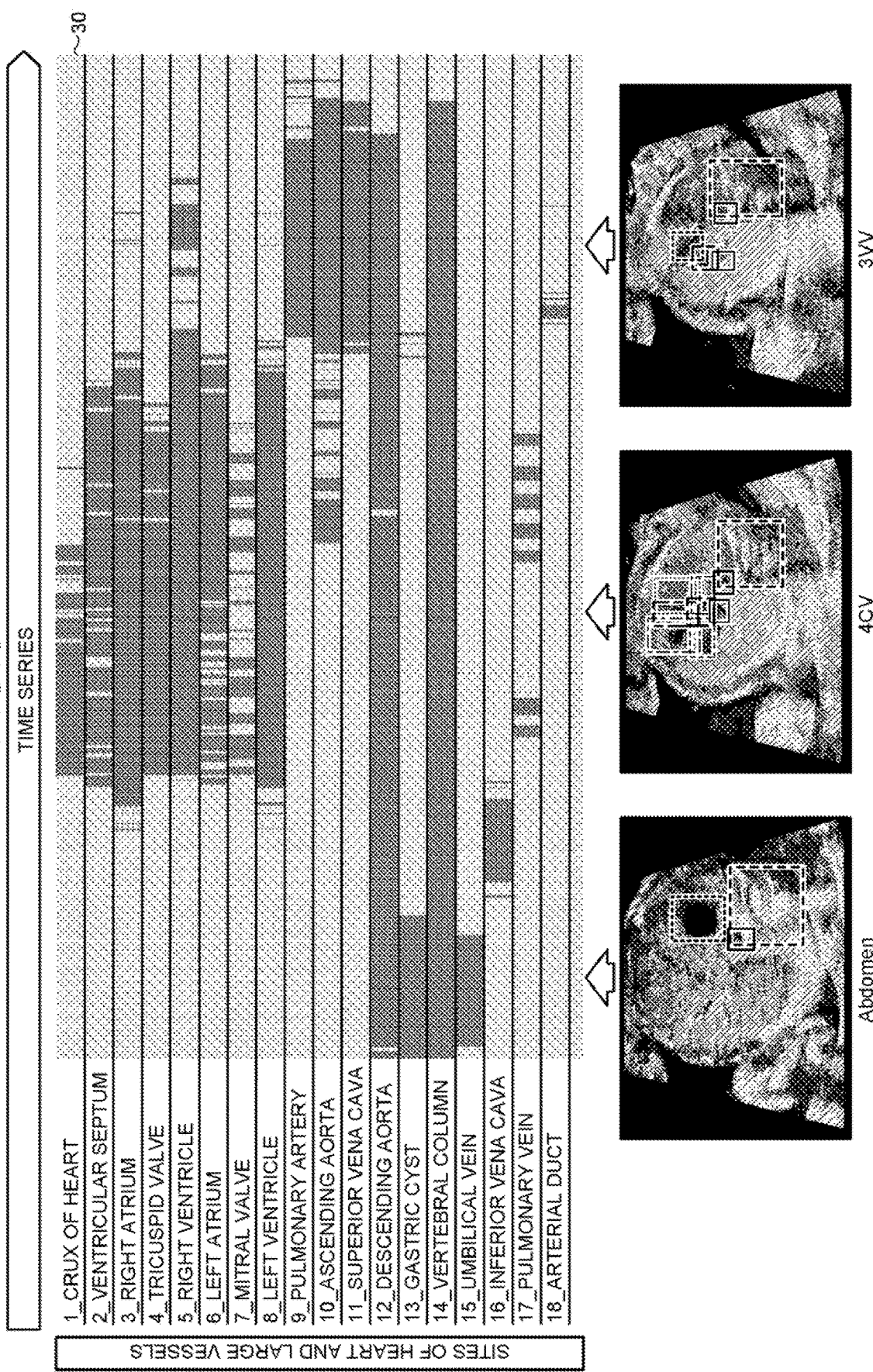
FIG. 3 is a diagram illustrating an example of a site detection map according to the first example.

The setting unit 143, the acquisition unit 144, and the calculation unit 145 perform a process of calculating a distributed representation. In this example, at least a part of feature values included in the detection map information 131 can be mapped in time series. FIG. 3 is a diagram illustrating an example of a site detection map according to the first example. The site detection map 30 in FIG. 3 is obtained by mapping the probability of each site in time series. That is, the site detection map 30 may be referred to as a two-dimensional map obtained by mapping the detection results on a two-dimensional plane in which the first axis is a plurality of types of feature values, and the second axis is the time series. In this example, such a drawing is referred to as a Barcode like timeline. Moreover, the Barcode like timeline may also be simply referred to as a timeline.

Figure 4:
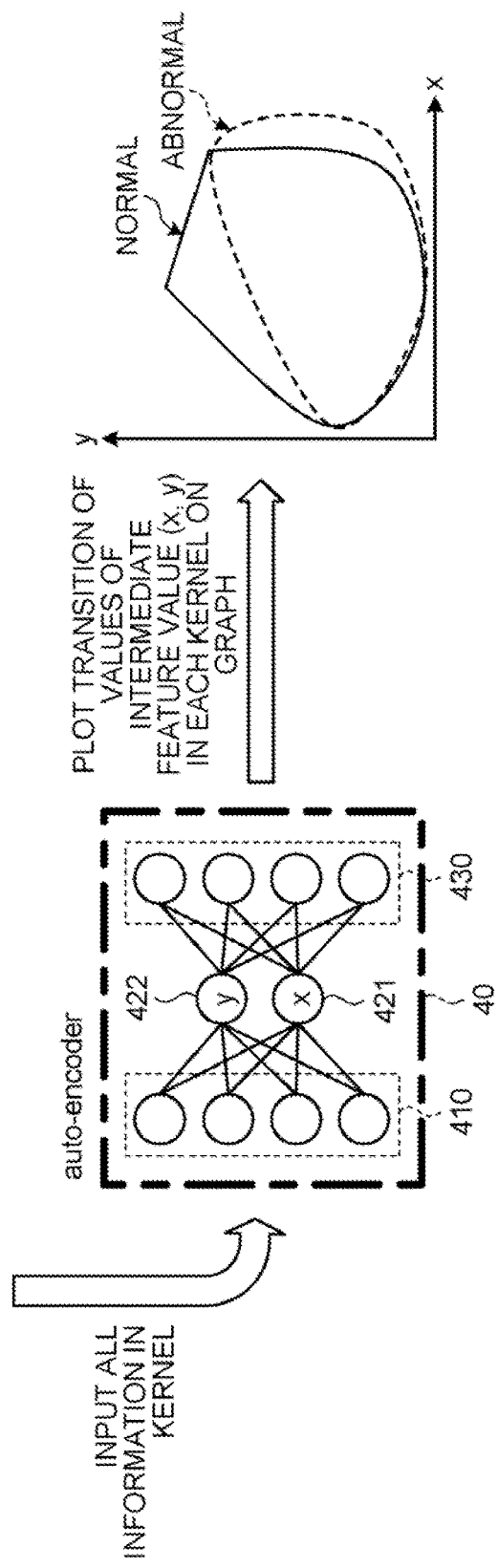
FIG. 4 is a diagram illustrating an example of a method of calculating a distributed representation according to the first example.

In the site detection map 30, the color of the bar may be darker in color with an increase in the probability. Hereinafter, a method of calculating a distributed representation will be described under an assumption that the autoencoder for calculating a distributed representation is already trained. A training method of the autoencoder will be described below. FIG. 4 is a diagram for explaining a method of calculating a distributed representation.

The setting unit 143 sets a section area with a predetermined width in the time series, for the detection map information 131. Such a section area is referred to as a kernel. The kernel may also be referred to as a window and the like. Moreover, the detection map information 131 is an example of information in which the detection result of each of the types of feature values and the time series of the frame images are associated with each of the frame images included in moving image data obtained by capturing images of an object.

In the detection map information 131, the acquisition unit 144 acquires the distribution state of the detection results in the section area, for each of a plurality of positions in the section area, when the position of the set section area is changed in time series. The probability and the coordinates of the rectangular area are examples of the distribution state. Moreover, the positions of the section area correspond to each time. That is, the acquisition unit 144 acquires the probability of each site in the frame image corresponding to each time, and the size and position of the rectangular area, from the detection map information 131 as the distribution state.

The calculation unit 145 calculates the distributed representation indicating a set of points obtained by projecting the distribution state of each of the positions onto a low-dimensional space. As illustrated in FIG. 4, the calculation unit 145 calculates the distributed representation indicating a set of points projected onto a two-dimensional space, by inputting the distribution state, that is, all the information in the kernel, to an autoencoder 40 in which the intermediate layer is formed by two units. The autoencoder 40 is built based on the model information 132. Moreover, the autoencoder 40 includes an input layer 410, an intermediate unit 421, an intermediate unit 422, and an output layer 430. The distributed representation is an intermediate feature value output from the intermediate unit 421 and the intermediate unit 422. Then, the display control unit 147 draws the trajectory of distributed representation, by plotting the transition of the intermediate feature values (x, y) of the kernels on a graph.

The determination unit 146 determines whether the moving image data to be determined is obtained by capturing images of an object in an abnormal state, by comparing the acquired distributed representation and the distributed representation obtained from the moving image data to be determined, which is obtained by capturing images of the object. Moreover, the display control unit 147 displays the trajectory of the points projected onto the two-dimensional space in time series on a screen. In this manner, the abnormal state may be automatically determined by the determination unit 146. Alternatively, abnormality determination, analysis, and the like may also be manually performed by a user who viewed the screen displayed by the display control unit 147.

In the case of the method of calculating a distributed representation as illustrated in FIG. 4, information such as the probability in the kernel, the position and size of the site, and the like are input into the autoencoder 40 all at once, and are encoded into distributed representations. Hence, there is no knowing which site information is contributing to the distributed representation. Moreover, a way of forming the distributed representation is probabilistically defined, and the position expressed by a normal or abnormal distributed representation vector will not be specified.

Figure 5:
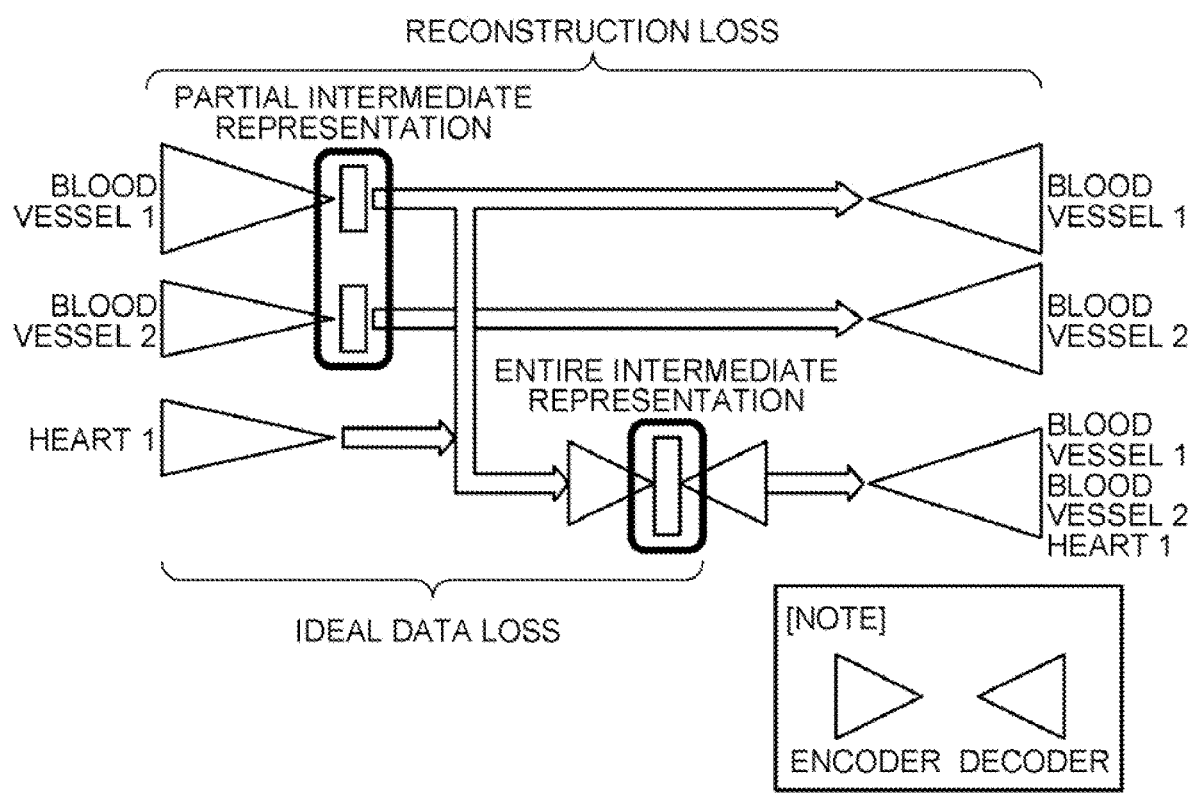
FIG. 5 is a diagram illustrating an example of a configuration of an autoencoder according to the first example.

Thus, by using the autoencoder as illustrated in FIG. 5, the distributed representation of the intermediate state is simultaneously acquired, by gradually processing the Barcode like timeline per site, and per group. Consequently, it is possible to determine which site information is contributing to the distributed representation. Moreover, by fixing the distributed representation vectors corresponding to a sample in the ideal state into one, it is possible to control the acquired distributed representation. The sample in the ideal state is information in which all target sites such as blood vessels and the heart appear in an image.

Figure 6:
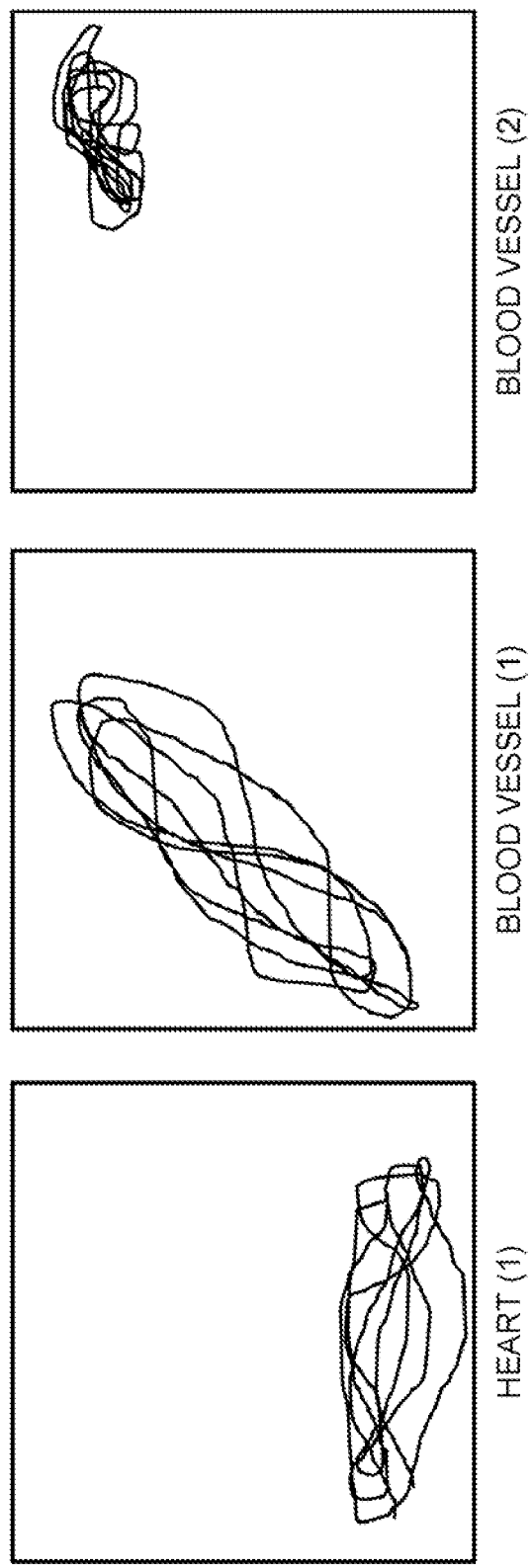
FIG. 6 is a diagram illustrating an example of a partial distributed representation of each site according to the first example.

FIG. 5 is a diagram illustrating an example of a configuration of an autoencoder according to the first example. As illustrated in FIG. 5, at the time of determination, the calculation device 10 acquires the partial intermediate representation of each site, for example, a blood vessel 1 and a blood vessel 2, which are important sites. FIG. 6 is a diagram illustrating an example of a partial distributed representation of each site according to the first example. Then, at the time of determination, the calculation device 10 integrates the data on the partial intermediate representation of each site into one, compresses the whole, acquires the entire intermediate representation, and restores the whole. Consequently, it is possible to analyze the site using the partial intermediate representation, and it is possible to analyze the whole heart using the entire intermediate representation.

Moreover, at the time of training, a model is built and optimized such that the reconstruction loss, in the example of FIG. 5, the loss of the blood vessel 1 and the blood vessel 1; the blood vessel 2 and the blood vessel 2; the blood vessel 1, the blood vessel 2, and a heart 1; and each of the blood vessel 1, the blood vessel 2, and the heart 1 is reduced.

Moreover, because the ideal data of the normal or abnormal state is known, at the time of training, a model may also be built and optimized such that not only the reconstruction loss, but also the ideal data loss from the input to the entire intermediate representation illustrated in FIG. 5 is reduced. In this case, a process of optimizing the process of reducing the ideal data loss, that is, the process via the entire intermediate representation may be performed, only when the ideal data is input. The process is intended to prevent the entire intermediate representation from being formed into various shapes by a random number, for example, to prevent the trajectory of the blood vessel in the disease state and the trajectory of the blood vessel in the ideal state from coming too close to each other or crossing with each other. Hence, to acquire the intended entire intermediate representation, the ideal state is input and is optimized.

Figure 7:
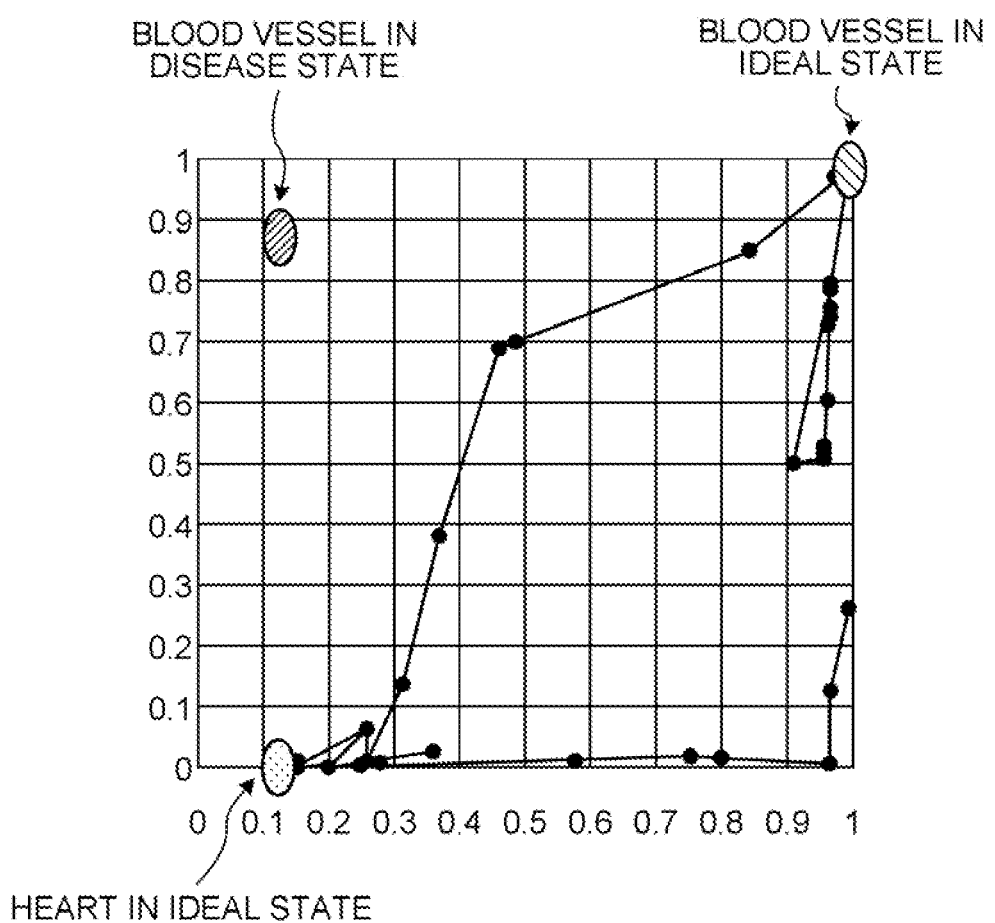
FIG. 7 is a diagram illustrating an example of an entire distributed representation according to the first example.

FIG. 7 is a diagram illustrating an example of an entire distributed representation according to the first example. As illustrated in FIG. 7, it is possible to control how the entire intermediate representation is expressed, by adding the distributed representation loss in the specified ideal state to the whole reconstruction loss, only when the ideal data is input during training. For example, in the entire intermediate representation illustrated in FIG. 7, a model is built such that the trajectory in the ideal state is drawn at a specific location during the ideal state, at the time of determination, and that the loss approaches zero, with a reduction in the distance from the trajectory in the ideal state, at the time of training. Moreover, the model may be built such that the trajectory in the abnormal state is drawn at a location different from that of the ideal state during the abnormal state, at the time of determination, and that the loss approaches zero, with a reduction in the distance from the trajectory in the ideal state, at the time of training. The model may also be built by another device instead of the calculation device 10.

Figure 8:
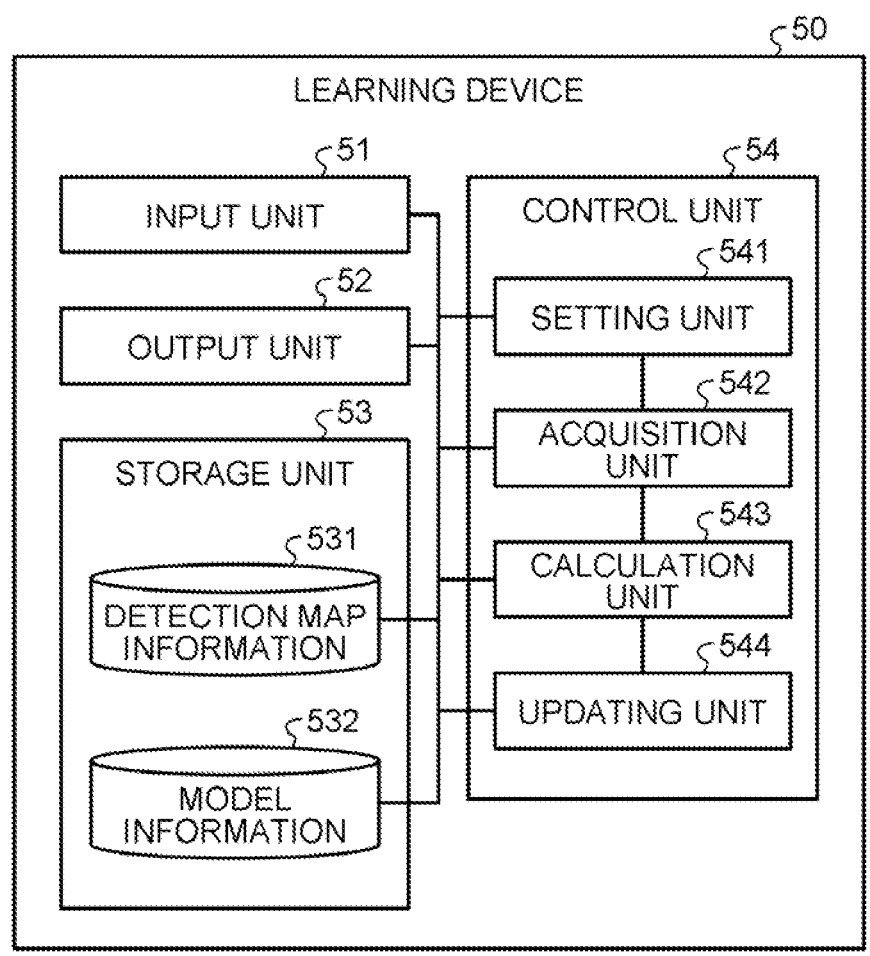
FIG. 8 is a diagram illustrating a configuration example of a learning device 50 according to the first example.

With reference to FIG. 8, a configuration of a learning device for training the autoencoder 40 will be described. FIG. 8 is a block diagram illustrating a configuration example of a learning device. As illustrated in FIG. 8, the learning device 50 includes an input unit 51, an output unit 52, a storage unit 53, and a control unit 54. The input unit 51 is an interface for data input. The output unit 52 is an interface for data output.

The storage unit 53 is an example of a storage device that stores data, a computer program executed by the control unit 54, and the like. For example, the storage unit 53 is a hard disk and memory. The storage unit 53 includes detection map information 531 and model information 532.

The detection map information 531 is data having the same format as that of the detection map information 131. However, the detection map information 531 is a feature value detected from a frame image in a normal state prepared for training and the like.

Similar to the model information 132, the model information 532 is a parameter for building the autoencoder 40 and the like. However, while the model information 132 is a trained parameter, the model information 532 may be an untrained or training parameter.

For example, the control unit 54 is implemented when a computer program stored in the internal storage device is executed by the CPU, MPU, GPU, or the like using RAM as a work area. Moreover, for example, the control unit 54 may also be implemented by an integrated circuit such as the ASIC and FPGA. The control unit 54 includes a setting unit 541, an acquisition unit 542, a calculation unit 543, and an updating unit 544.

It is assumed that the setting unit 541, the acquisition unit 542, and the calculation unit 543 each have the function similar to that of the setting unit 143, the acquisition unit 144, and the calculation unit 145. Based on the calculation result of the calculation unit 145, the updating unit 544 updates the model information 532.

Flow of Processes

Figure 9:
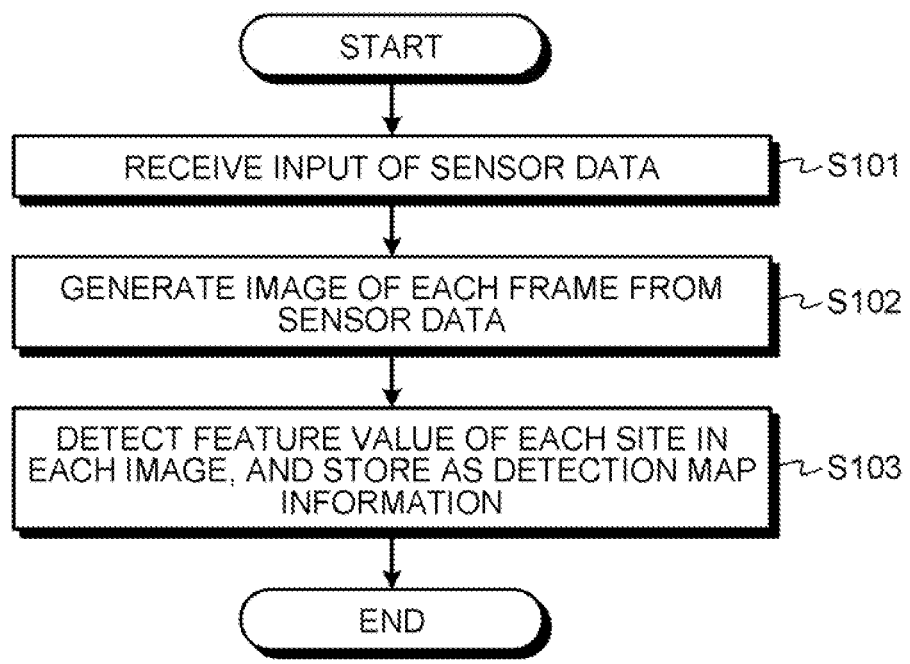
FIG. 9 is a flowchart illustrating a flow of a detection process according to the first example.

Next, with reference to FIG. 9, a flow of a detection process of the calculation device 10 will be described. FIG. 9 is a flowchart illustrating a flow of a detection process according to the first example. The detection process is a process mainly performed by the generation unit 141 and the detection unit 142 of the calculation device 10.

As illustrated in FIG. 9, first, the calculation device 10 receives input of sensor data (step S101). Next, the calculation device 10 generates an image of each frame from the sensor data (step S102). Then, the calculation device 10 detects a feature value of each site in each image, and stores the detected feature value in the storage unit 13 as the detection map information 131 (step S103). After executing step S103, the detection process illustrated in FIG. 9 will be finished.

Figure 10:
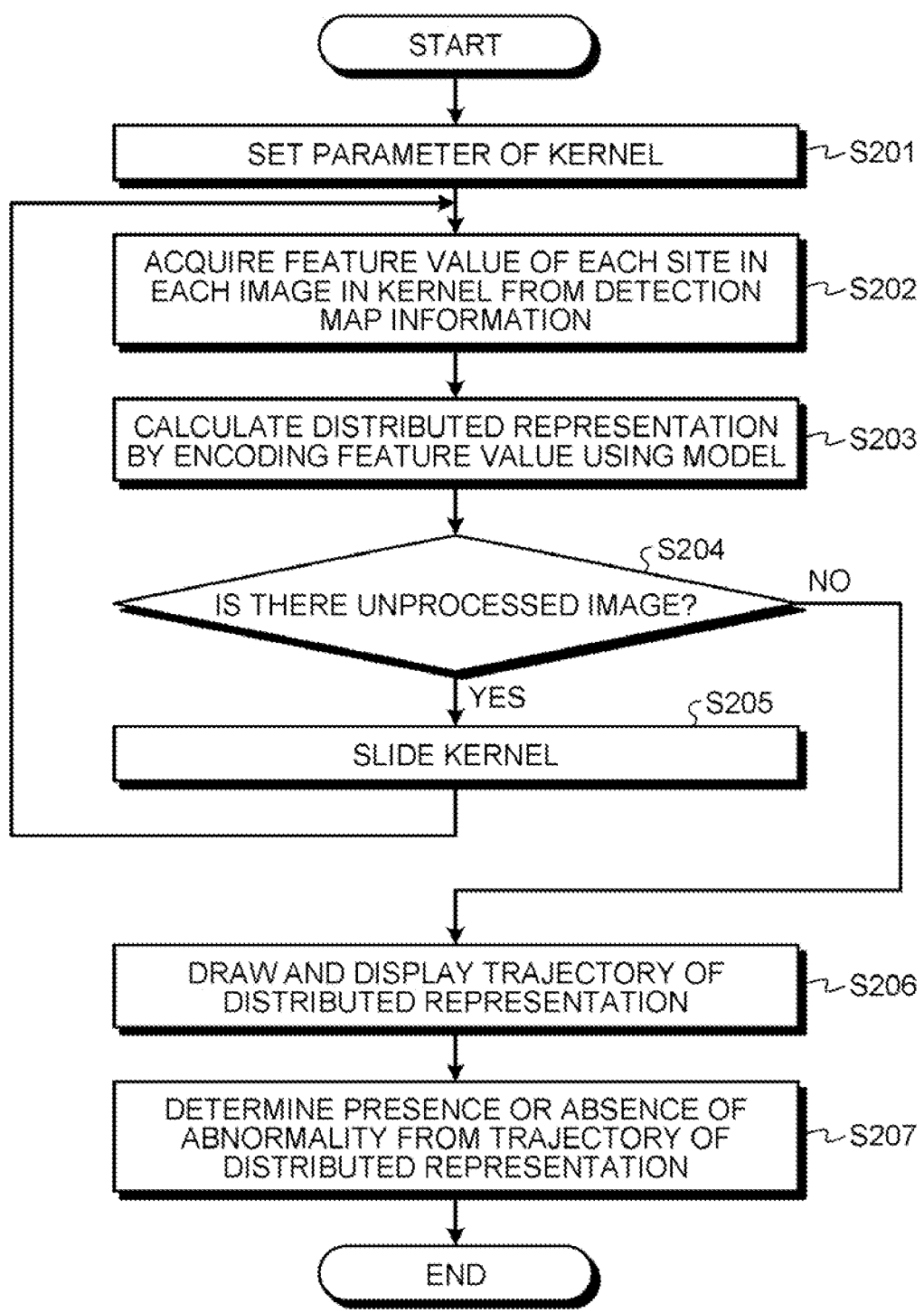
FIG. 10 is a flowchart illustrating a flow of an abnormality determination process according to the first example.

Next, with reference to FIG. 10, a flow of an abnormality determination process of the calculation device 10 will be described. FIG. 10 is a flowchart illustrating a flow of an abnormality determination process according to the first example. The abnormality determination process is a process mainly performed by the calculation unit 145 and the determination unit 146 of the calculation device 10.

As illustrated in FIG. 10, first, the calculation device 10 sets a parameter of a kernel (step S201). Next, the calculation device 10 acquires the feature value of each site in each image in the kernel from the detection map information 131 (step S202).

Then, the calculation device 10 calculates the distributed representation, by encoding the feature value using the model (step S203). In this example, at step S203, to calculate the distributed representation, a partial distributed representation and an entire distributed representation are calculated. The partial distributed representation is calculated by encoding the feature value in the kernel per important site such as a blood vessel and the heart. The entire distributed representation is calculated by integrating data on the partial intermediate representation of each site into one, and encoding the whole.

Next, the calculation device 10 determines whether there is an unprocessed image (step S204). If there is an unprocessed image (Yes at step S204), the calculation device 10 slides the kernel (step S205), returns to step S202, and repeats the process.

On the other hand, if there is no more unprocessed image (No at step S204), the calculation device 10 draws and displays the trajectory of the distributed representation (step S206). At step S206, as the trajectory of the distributed representation, trajectories of the partial distributed representation and the entire distributed representation calculated at step S203 are drawn, and the distributed representations as illustrated in FIG. 6 and FIG. 7 are drawn.

Then, the calculation device 10 determines the presence or absence of abnormality from the trajectory of the distributed representation (step S207). After executing step S207, the abnormality determination process illustrated in FIG. 10 will be finished.

Figure 11:
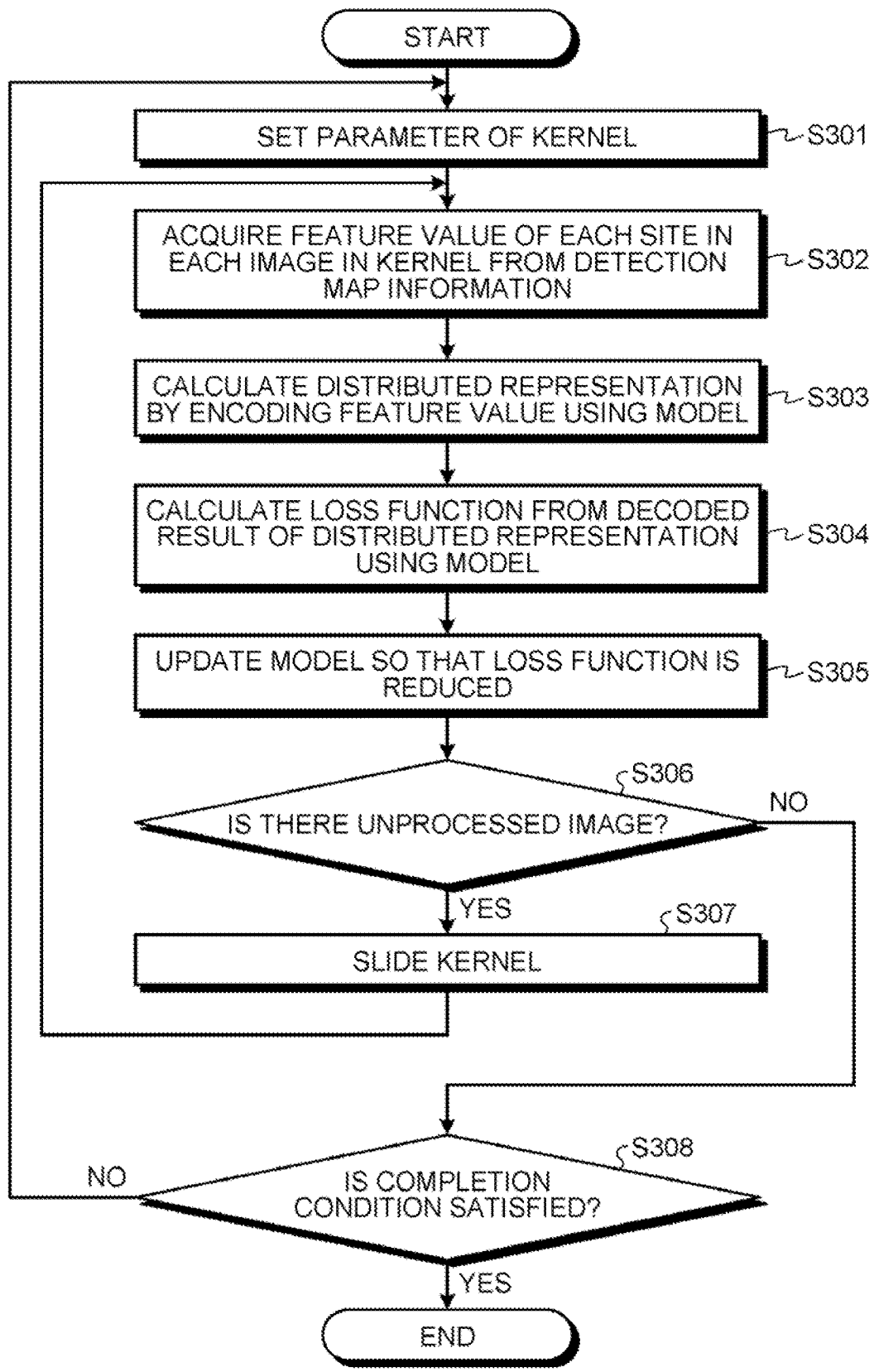
FIG. 11 is a flowchart illustrating a flow of a machine learning process according to the first example.

Next, with reference to FIG. 11, a flow of a machine learning process of the learning device 50 will be described. FIG. 11 is a flowchart illustrating a flow of a machine learning process according to the first example. The learning device 50 adds each loss function calculated from the decoded result of each of the partial intermediate representations in FIG. 5 and the loss function calculated from the decoded result of each of the entire intermediate representations in FIG. 5, and performs optimization so that the added loss function is reduced.

As illustrated in FIG. 11, first, the learning device 50 sets a parameter of a kernel (step S301). Next, the learning device 50 acquires the feature value of each site in each image in the kernel, from the detection map information 531 (step S302). Then, the learning device 50 calculates the distributed representation, by encoding the feature value using the model (step S303). Moreover, the learning device 50 calculates a loss function from the decoded result of the distributed function using the model (step S304). For example, in the example of FIG. 5, the loss function of each of the blood vessel 1 at the input side and the blood vessel 1 at the output side; the blood vessel 2 at the input side and the blood vessel 2 at the output side; the blood vessel 1, the blood vessel 2, and the heart 1 at the input side; and the blood vessel 1, the blood vessel 2, and the heart 1 at the outside side, which is the loss function of reconstruction, is calculated and added.

Moreover, the learning device 50 updates the model so that the loss function calculated at step S304 is reduced (step S305). In the example of FIG. 5, the loss functions of the blood vessel 1 at the input side and the blood vessel 1 at the output side; the blood vessel 2 at the input side and the blood vessel 2 at the output side; the blood vessel 1, the blood vessel 2, and the heart 1 at the input side; and the blood vessel 1, the blood vessel 2, and the heart 1 at the output side are optimized and reduced. Furthermore, when the ideal data in the normal or abnormal state is input, the learning device 50 may also update the model so that the ideal data loss from the input to the entire intermediate representation is reduced, as described above with reference to FIG. 5.

Next, the learning device 50 determines whether there is an unprocessed image (step S306). If there is an unprocessed image (Yes at step S306), the learning device 50 slides the kernel (step S307), returns to step S302, and repeats the process. On the other hand, if there is no more unprocessed image (No at step S306), the learning device 50 determines whether the completion condition of the learning process is satisfied (step S308).

If the completion process of the learning process is not satisfied (No at step S308), the learning device 50 returns to step S301, and repeats the process. For example, the completion condition of the learning process is satisfied when the process from step S301 to S307 is repeated for a predetermined number of times. When the completion condition of the learning process is satisfied (Yes at step S308), the machine learning process illustrated in FIG. 11 will be finished.

Advantageous Effects

As described above, the calculation device 10 acquires a first distributed representation of a partial image corresponding to a specific site of an object to be examined included in each of a plurality of images, by executing machine learning performed by an autoencoder using a partial image of an area corresponding to the specific site, for each of one or more specific sites. The calculation device 10 also acquires a second distributed representation of the images, based on the first distributed representation and the result of machine learning performed by the autoencoder, using the images. Moreover, abnormality determination on the object to be examined included in an image to be determined is executed, based on the first distributed representation and the second distributed representation.

In the abnormality determination using the trajectory of the distributed representation of a detection site by using the object detection technology, the distributed representation of the intermediate state can be simultaneously acquired by gradually processing per site, using the autoencoder. Hence, it is possible to analyze which site has contributed to the distributed representation.

Moreover, the process of executing machine learning performed by the autoencoder using the partial image, which is executed by the calculation device 10, includes a process of inputting the feature value acquired from the partial image into the autoencoder.

Consequently, in the abnormal determination using the trajectory of the distributed representation, it is possible to analyze which site has contributed to the distributed representation, per site.

Moreover, the process of inputting the feature value acquired from the partial image into the autoencoder, which is executed by the calculation device 10, includes a process of inputting the feature value acquired from a partial image of a predetermined time width in time series data with respect to the images into the autoencoder.

Consequently, it is possible to draw the trajectory of the distributed representation, and perform abnormality determination using the trajectory of the distributed representation.

Furthermore, the process of acquiring the first distributed representation, which is executed by the calculation device 10, includes a process of acquiring the first distributed representation by plotting the first intermediate feature value acquired by executing machine learning performed by the autoencoder using the partial image, on a graph for each predetermined time width. Also, the process of acquiring the second distributed representation, which is executed by the calculation device 10, includes a process of acquiring the second distributed representation by plotting the second intermediate feature value acquired by executing machine learning performed by the autoencoder, using the first distributed representation and the result, on a graph for each predetermined time width.

Consequently, it is possible to draw the trajectory of the distributed representation, and perform abnormality determination using the trajectory of the distributed representation.

Still furthermore, the process of inputting the feature value acquired from the partial image into the autoencoder, which is executed by the calculation device 10, includes a process of inputting at least one of the probability that is the likelihood of the corresponding specific site appearing in the partial image, and the position and size of the partial image with respect to the whole images into the autoencoder, as the feature value.

Consequently, in the abnormality determination using the trajectory of the distributed representation, it is possible to analyze which site has contributed to the distributed representation, per site.

Still furthermore, the learning device 50 executes at least one of a process of inputting a feature value when the object to be examined is in a normal state into the autoencoder, and a process of inputting a feature value when the object to be examined is in an abnormal state into the autoencoder.

Consequently, in the distributed representation, the learning device 50 can be defined such that the trajectory in the ideal state is drawn at a specific location during the ideal state, and the trajectory in the abnormal state is drawn at a location other than that of the ideal state during the abnormal state.

System

The information including processing procedures, control procedures, specific names, and various types of data and parameters described in the above documents and drawings may be optionally changed unless otherwise specified. Moreover, specific examples, distribution, numerical values, and the like described in the examples are merely examples, and may be optionally changed.

Moreover, the components of the illustrated devices are functionally conceptual, and need not be physically configured as illustrated. That is, the specific mode of dispersion and integration of each device is not limited to the ones illustrated in the drawings. All or a part of the devices may be functionally or physically dispersed or integrated in an optional unit, depending on various kinds of loads and the status of use. All or an optional part of each processing function carried out in each device are implemented by a CPU and a computer program analyzed and executed by the CPU, or may be implemented as hardware by the wired logic.

Hardware

Figure 12:
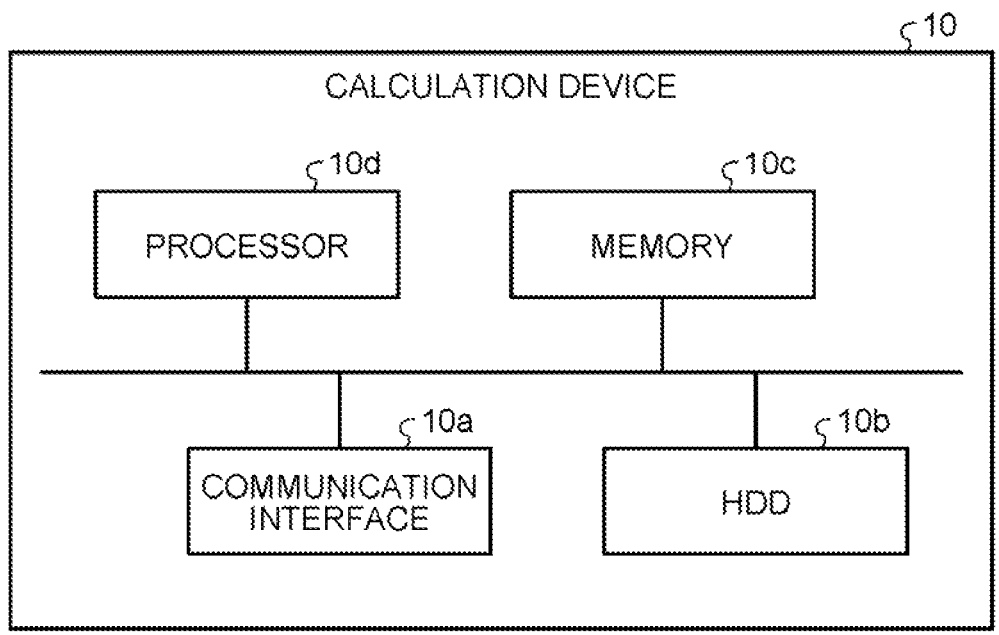
FIG. 12 is a diagram for explaining an example of a hardware configuration.

FIG. 12 is a diagram for explaining an example of a hardware configuration. As illustrated in FIG. 12, the calculation device 10 includes a communication interface 10*a*, a hard disk drive (HDD) 10*b*, memory 10*c*, and a processor 10*d*. Moreover, the units illustrated in FIG. 12 are connected to each other via a bus and the like. The learning device 50 may also have a similar configuration.

The communication interface 10*a* is a network interface card and the like, and communicates with another server. The HDD 10*b* stores a computer program that operates the functions illustrated in FIG. 1 and database (DB).

The processor 10*d* is a hardware circuit that operates the process of executing the functions described in FIG. 1 and the like, by reading a computer program for executing the process similar to that of each processing unit illustrated in FIG. 1 from the HDD 10*b* and the like, and by developing the computer program in the memory 10*c*. That is, this process executes the function similar to that of each processing unit included in the calculation device 10. More specifically, the processor 10*d* reads a computer program having the function similar to that of the generation unit 141 and the detection unit 142 from the HDD 10*b* and the like. Then, the processor 10*d* executes a process that executes the process similar to that of the generation unit 141, the detection unit 142, and the like.

In this manner, the calculation device 10 operates as a calculation device that executes an operation control process, by reading and executing the computer program that executes the process similar to that of each of the processing units illustrated in FIG. 1. Moreover, the calculation device 10 may also implement the function similar to that of the example described above, by reading a computer program from a recording medium by a medium reading device, and executing the read computer program. The computer program in the other example is not only executed by the calculation device 10. For example, the present embodiment is similarly applicable when another computer or a server executes the computer program, or the other computer and the server cooperatively execute the computer program.

Moreover, the computer program that executes the process similar to that of each of the processing units illustrated in FIG. 1 can also be distributed via a network such as Internet. Furthermore, this computer program can also be recorded on a computer-readable recording medium such as a hard disk, a flexible disk (FD), a compact disc-read only memory (CD-ROM), a magneto-optical disk (MO), and a digital versatile disc (DVD), and executed by being read out from the recording medium by a computer.

Second Example

While examples of the present invention have been described, embodiments of the present invention may be implemented in various other forms in addition to the examples described above.

In one aspect, in the abnormality determination using distributed representation of a detection site by using the object detection technology, it is possible to analyze which site has contributed to the distributed representation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a calculation program that causes a computer to execute a process comprising:

acquiring a first distributed representation by inputting information of a partial image corresponding to a target site of an object to an autoencoder that executes machine learning using the partial image of an area corresponding to the each site, for each of one or more target sites of the object included in each of a plurality of images; and acquiring a second distributed representation by integrating one or more first distributed representations acquired at the acquiring into one, and compressing a whole, wherein abnormality determination on the object to be examined included in an image to be determined is executed, based on trajectories of the points of the first distributed representation and the second distributed representation, respectively, by plotting the points onto the two-dimensional space in time series.

2. The non-transitory computer-readable recording medium according to claim 1, wherein the executing machine learning performed by the autoencoder using the partial image includes inputting a feature value acquired from the partial image into the autoencoder.

3. The non-transitory computer-readable recording medium according to claim 2, wherein the inputting the feature value acquired from the partial image into the autoencoder includes inputting the feature value acquired from the partial image of a predetermined time width in time series data with respect to the plurality of images into the autoencoder.

4. The non-transitory computer-readable recording medium according to claim 3, wherein
the acquiring the first distributed representation includes acquiring the first distributed representation by plotting a first intermediate feature value acquired by executing machine learning performed by the autoencoder using the partial image, on a graph for each predetermined time width, and
the acquiring the second distributed representation includes acquiring the second distributed representation by plotting a second intermediate feature value acquired by executing machine learning performed by the autoencoder using the first distributed representation and the result, on a graph for each predetermined time width.

5. The non-transitory computer-readable recording medium according to claim 1, wherein the inputting a feature value acquired from the partial image into the autoencoder includes inputting probability that is likelihood of a corresponding specific site appearing in the partial image, a position and size of the partial image with respect to whole images into the autoencoder, or both thereof, as the feature value.

6. The non-transitory computer-readable recording medium according to claim 1, wherein the process further includes inputting a feature value when the object to be examined is in a normal state into the autoencoder, inputting a feature value when the object to be examined is in an abnormal state into the autoencoder, or both thereof.

7. A calculation method comprising:
acquiring a first distributed representation by inputting information of a partial image corresponding to a target site of an object to an autoencoder that executes machine learning using the partial image of an area corresponding to the each site, for each of one or more target sites of the object included in each of a plurality of images; and
acquiring a second distributed representation by integrating one or more first distributed representations acquired at the acquiring into one, and compressing a whole, wherein
abnormality determination on the object to be examined included in an image to be determined is executed, based on trajectories of the points of the first distributed representation and the second distributed representation, respectively, by plotting the points onto the two-dimensional space in time series.

8. The calculation method according to claim 7, wherein the executing machine learning performed by the autoencoder using the partial image includes inputting a feature value acquired from the partial image into the autoencoder.

9. The calculation method according to claim 8, wherein the inputting the feature value acquired from the partial image into the autoencoder includes inputting the feature value acquired from the partial image of a predetermined time width in time series data with respect to the plurality of images into the autoencoder.

10. The calculation method according to claim 9, wherein
the acquiring the first distributed representation includes acquiring the first distributed representation by plotting a first intermediate feature value acquired by executing machine learning performed by the autoencoder using the partial image, on a graph for each predetermined time width, and
the acquiring the second distributed representation includes acquiring the second distributed representation by plotting a second intermediate feature value acquired by executing machine learning performed by the autoencoder using the first distributed representation and the result, on a graph for each predetermined time width.

11. The calculation method according to claim 7, wherein the inputting the feature value acquired from the partial image into the autoencoder includes inputting probability that is likelihood of the corresponding specific site appearing in the partial image, a position and size of the partial image with respect to the whole images into the autoencoder, or both thereof, as the feature value.

12. The calculation method according to claim 7, further including inputting a feature value when the object to be examined is in a normal state into the autoencoder, inputting a feature value when the object to be examined is in an abnormal state into the autoencoder, or both thereof.

13. A calculation device comprising:
a processor configured to:
acquire a first distributed representation by inputting information of a partial image corresponding to a target site of an object to an autoencoder that executes machine learning using the partial image of an area corresponding to the each site, for each of one or more target sites of the object included in each of a plurality of images; and
acquire a second distributed representation by integrating one or more first distributed representations acquired at the acquiring into one, and compressing a whole, wherein
abnormality determination on the object to be examined included in an image to be determined is executed, based on trajectories of the points of the first distributed representation and the second distributed representation, respectively, by plotting the points onto the two-dimensional space in time series.

14. The calculation device according to claim 13, wherein the processor is further configured to input a feature value acquired from the partial image into the autoencoder.

15. The calculation device according to claim 14, wherein the processor is further configured to input the feature value acquired from the partial image of a predetermined time width in time series data with respect to the plurality of images into the autoencoder.

16. The calculation device according to claim 15, wherein the processor is further configured to:
acquire the first distributed representation includes acquiring the first distributed representation by plotting a first intermediate feature value acquired by executing machine learning performed by the autoencoder using the partial image, on a graph for each predetermined time width, and
acquire the second distributed representation by plotting a second intermediate feature value acquired by executing machine learning performed by the autoencoder using the first distributed representation and the result, on a graph for each predetermined time width.

17. The calculation device according to claim 13, wherein the processor is further configured to input the feature value acquired from the partial image into the autoencoder includes inputting probability that is likelihood of the corresponding specific site appearing in the partial image, a position and size of the partial image with respect to the whole images into the autoencoder, or both thereof, as the feature value.

18. The calculation device according to claim 13, wherein the processor is further configured to execute a process including inputting a feature value when the object to be examined is in a normal state into the autoencoder, inputting a feature value when the object to be examined is in an abnormal state into the autoencoder, or both thereof.

* * * * *